(12) United States Patent
Mortier et al.

(10) Patent No.: US 7,730,702 B2
(45) Date of Patent: Jun. 8, 2010

(54) BELT DRIVE FOR A HARVESTING HEADER WITH A MOVABLE CUTTERBAR

(75) Inventors: Geert P. Mortier, Ghent (BE); Paolo Pictricola, Kapellen (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/460,502

(22) Filed: Jul. 20, 2009

(65) Prior Publication Data

US 2010/0018176 A1    Jan. 28, 2010

(51) Int. Cl.
*A01D 34/00*    (2006.01)

(52) U.S. Cl. .............................. 56/13.6; 56/221; 474/87; 474/85

(58) Field of Classification Search .................... 474/87, 474/85, 135, 137; 56/221, 15.3, 15.8, 14.3, 56/14.4, 13.6
See application file for complete search history.

(56) References Cited

U.S. PATENT DOCUMENTS

| 2,459,379 | A | * | 1/1949 | Hanson ...................... 474/135 |
| 3,014,328 | A | * | 12/1961 | Scarnato et al. .............. 56/15.3 |
| 3,528,231 | A | * | 9/1970 | Everett et al. ................ 56/11.3 |
| 3,643,720 | A | * | 2/1972 | Sadler et al. ................. 241/155 |
| 3,763,715 | A | * | 10/1973 | Pollard et al. ............... 474/137 |
| 3,982,383 | A | * | 9/1976 | Mott .......................... 56/11.6 |
| 4,011,709 | A |   | 3/1977 | Mott |
| 4,069,650 | A | * | 1/1978 | Montanari et al. ............ 56/221 |
| 4,091,602 | A | * | 5/1978 | Williams et al. ............. 56/14.4 |
| 4,191,006 | A |   | 3/1980 | Johnson |
| 4,409,778 | A | * | 10/1983 | McNaught ............... 56/10.2 A |
| 4,573,308 | A |   | 3/1986 | Ehrecke |
| 4,800,711 | A |   | 1/1989 | Hurlburt |
| 4,845,931 | A | * | 7/1989 | Bruner et al. ................. 56/208 |
| 5,261,216 | A | * | 11/1993 | Schumacher et al. ......... 56/14.4 |
| 6,116,008 | A | * | 9/2000 | Digman et al. ............... 56/15.8 |
| 2006/0089219 | A1 | * | 4/2006 | Maertens et al. ............. 474/87 |

FOREIGN PATENT DOCUMENTS

EP    1653122    5/2006

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A header for a harvesting machine with a movable cutterbar includes a belt drive mechanism connecting a stationary pulley mounted on the frame of the header and a relatively movable pulley mounted on the movable part of the header. The belt drive mechanism includes two guide pulleys, a belt mounted along said pulleys, and a pivot assembly mounted on the auger shaft. The guide pulleys are mounted on opposite lever arms of the pivot and said belt drive mechanism further includes a tensioning mechanism.

11 Claims, 3 Drawing Sheets

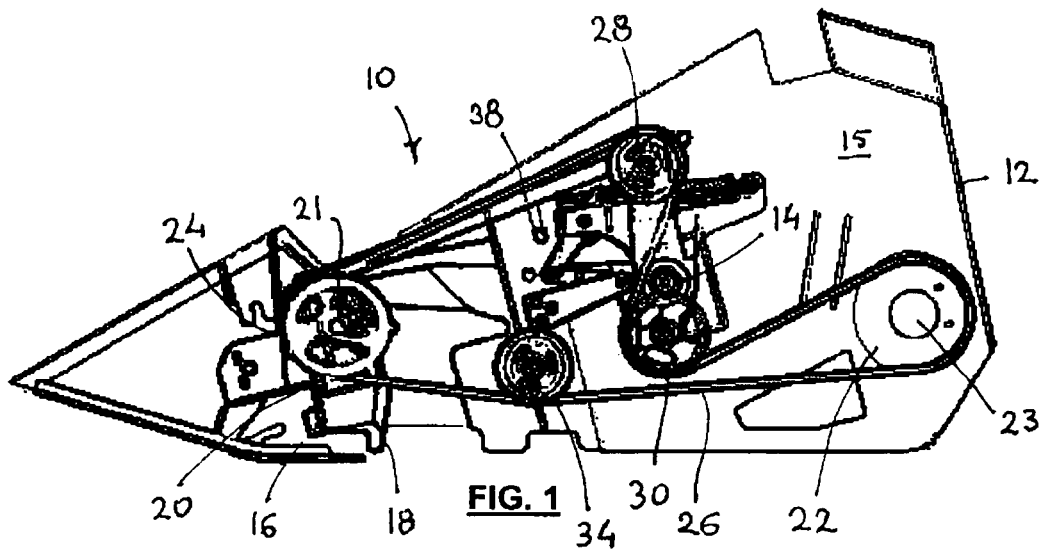
FIG. 1
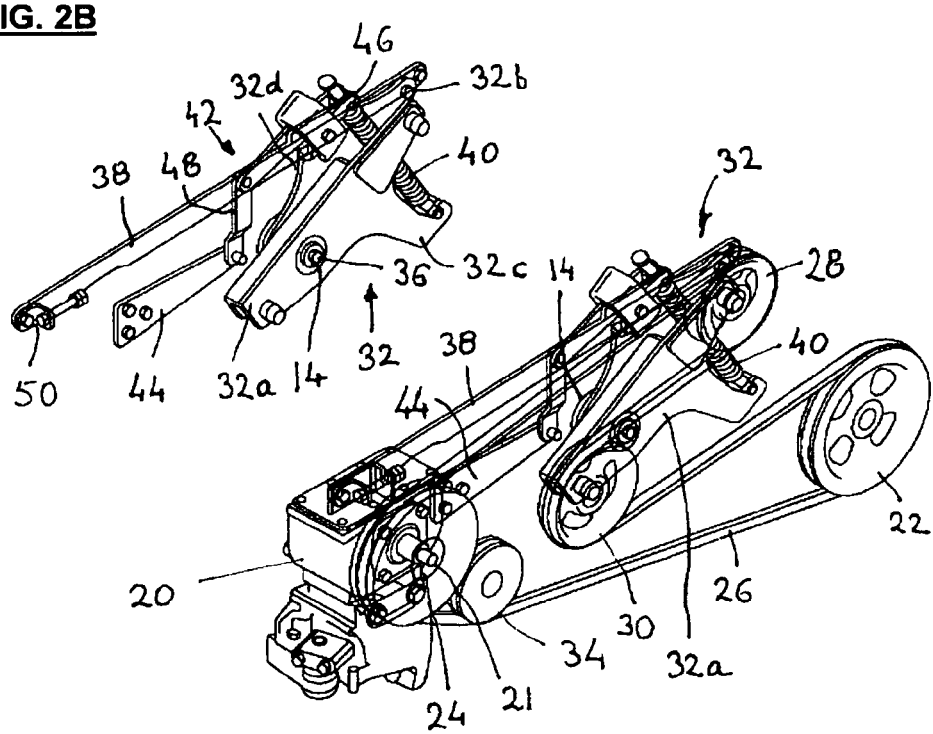
FIG. 2B
FIG. 2A

BELT DRIVE FOR A HARVESTING HEADER WITH A MOVABLE CUTTERBAR

CROSS REFERENCE TO RELATED APPLICATIONS

This Patent Application claims priority under 35 U.S.C. 119 to EP 08.160.925.7, filed on Jul. 22, 2008 titled, "Belt drive for a harvesting header with a movable cutterbar" and having Geert P. Mortier and Paolo Pietricola as inventors. The full disclosure of EP 08.160.925.7 is hereby fully incorporated herein by reference.

FIELD OF THE INVENTION

The present invention relates to a belt drive for a harvester header with a movable cutterbar.

BACKGROUND OF THE INVENTION

One type of header that is fitted to combine harvesters for harvesting grain comprises a reel that extends transversely to the direction of travel. An elongate cutterbar located beneath the reel cuts the stalks of the crop, spring tines projecting from the rotating reel engage the cut stalks and push them on to an auger that conveys the crop towards the centre of the harvester. From there, the crop is carried into the processing machinery of the harvester.

The optimal distance between the cutterbar and the auger depends on the type of crop being harvested. Therefore the cutter is mounted in such a manner that it can be moved forwards and backwards relative to the auger.

The cutterbar comprises a set of blades, movable in a reciprocated movement relative to stationary blade guides by means of a so-called wobble box. The cutter and its drive mechanism are mounted on a header sub-frame that can be moved relative to the main frame of the header by more than 50 cms, typically. The wobble box has a drive pulley that is driven by a belt which passes over a stationary powered pulley mounted to the main frame of the header. A belt configuration is therefore required which does not obstruct the movement of the cutter sub-frame, yet which maintains the drive belt under the correct tension to drive the wobble box in all positions of the cutter sub-frame.

The geometry of the belt drive for a movable cutter of a harvester is further complicated by the magnitude of the permissible movement. It is necessary to ensure that the different runs of the belt never touch one another in any position of the cutterbar sub-frame. Furthermore, the belt and its various drive, guide and tensioning pulleys must all remain protected within a housing that covers the entire drive mechanism to prevent entanglement of the crop.

Prior art attempts to meet the above criteria have resulted in belt geometries having as many as eight different pulleys and, despite their complexity, additional pivot points were needed in the frame to allow pulleys to be repositioned to achieve the desired belt tension in different positions of the cutter.

Nowadays extendable headers use one or two idlers/tensioners mounted on a pivoting arm. Said arm is mounted onto a shaft welded to the header frame. A disadvantage is that the belt can not be kept tight over the full range of knife displacement. For full forward movement of the header, the belt needs to be demounted and remounted along a different path. Furthermore, in order to keep the belt tight over the full extension range, a very long spring is needed.

EP 1,653,122 describes a belt drive for connecting a stationary pulley to a relatively movable pulley, comprising a first guide pulley mounted in a fixed position in relation to the stationary pulley and a second guide pulley mounted for movement with the movable pulley, wherein the second guide pulley is capable of a limited degree of movement relative to the movable pulley and is spring biased in a direction to maintain the belt in tension. The second guide pulley is mounted on a long arm welded to the wobblebox support and movable with the header. Such a system can keep the belt under tension, but it suffers highly from vibration problems. The long arm amplifies the vibrations of the header frame it is welded to. Such a system also creates problems for accessing the auger drive area.

SUMMARY OF THE INVENTION

According to the present invention there is provided an extendable header for a harvesting machine, said header comprising a cutterbar mounted on a movable part of the header, an auger mounted to an auger shaft, and a belt drive mechanism drivingly connecting a stationary pulley mounted on the frame of the header and a relatively movable pulley mounted on the movable part of the header, said belt drive mechanism further comprising two guide pulleys, a belt mounted along said pulleys, and a pivot assembly, wherein said pivot assembly is mounted on the shaft of a rotatable element of the header and said guide pulleys are mounted on opposite lever ends of the pivot assembly, said pivot (12) being movable concurrently with the movable part of the header.

This arrangement provides for a compact tensioning mechanism, which allows for a wide extension range without hindering other components or drives on the side wall of the header. Preferably, the pivot assembly is mounted on the shaft of the auger. The full pivot assembly may be removably mounted thereon by a bushing. For easy replacement and access to the header frame, the assembly may be connected by a single bolt.

In a preferred embodiment the pivot assembly comprises two pivotable elements and an intermediate spring mounted to one of the elements. The two guide pulleys are mounted both on one of the pivotable elements.

In a further aspect of the invention the belt drive mechanism further comprises a tensioning mechanism comprising a positioning linkage, a spring and a tensioning linkage, said positioning linkage being mounted between the movable part of the header and one of the pivotable elements, while the tensioning linkage is mounted between the header frame and the other of the pivotable elements and said spring is mounted between the first pivotable element and the tensioning linkage. Such mechanism can be used for keeping the belt tension constant over the full range of the belt, whatever the position of the guide pulleys.

The mechanism can be configured to compresses/decompresses the spring (20) when the header cutterbar is moved away from/towards the frame.

Advantageously, the tensioning control linkage is a hinge system that compresses the spring when the header is moved towards a middle position, and decompresses the spring when the header is moved towards the fully extended or fully retracted position.

In one embodiment one guide pulley is pivoted towards the movable pulley and the other guide pulley is pivoted towards the stationary pulley, such that the zigzag path traced by the belt around the pulleys is flattened and the belt gives more length between the pulleys and, when the cutterbar is moved away from the frame, and vice versa when the cutterbar is moved towards the frame. One guide pulley may be positioned closer to the auger shaft than the other guide pulley.

The relatively movable pulley can be fitted to the input shaft of a wobble box for reciprocating the blades of the cutterbar and one or more idler or support pulleys may be mounted on the frame of the header.

The present invention has some important advantages over the prior art. The belt has a full range and is tight over this full header extension range. The belt drive system is compact and can be mounted on the auger shaft. As such, all parts of the header are easily accessible. The system is completely contained within one end shield, e.g. the left-hand end shield. Vibrations are kept to a minimum or counter-controlled; the spring is as short as possible as are all the other parts of the system, and the tensioning system is mounted on the header frame. Last but not least, there are no special tools required for (dis)assembling the belt.

BRIEF DESCRIPTION OF THE DRAWINGS

The invention will now be described in further detail, by way of example only, with reference to the accompanying drawings, in which:

FIG. 1 is a schematic representation of the side of an extendable grain header comprising a belt drive according to the invention;

FIG. 2A is a perspective view of the belt drive of FIG. 1;

FIG. 2B is a perspective view of the belt drive after removal of the pulleys, the belt and the gearbox;

DETAILED DESCRIPTION OF THE PREFERRED EMBODIMENT

Figure 3:
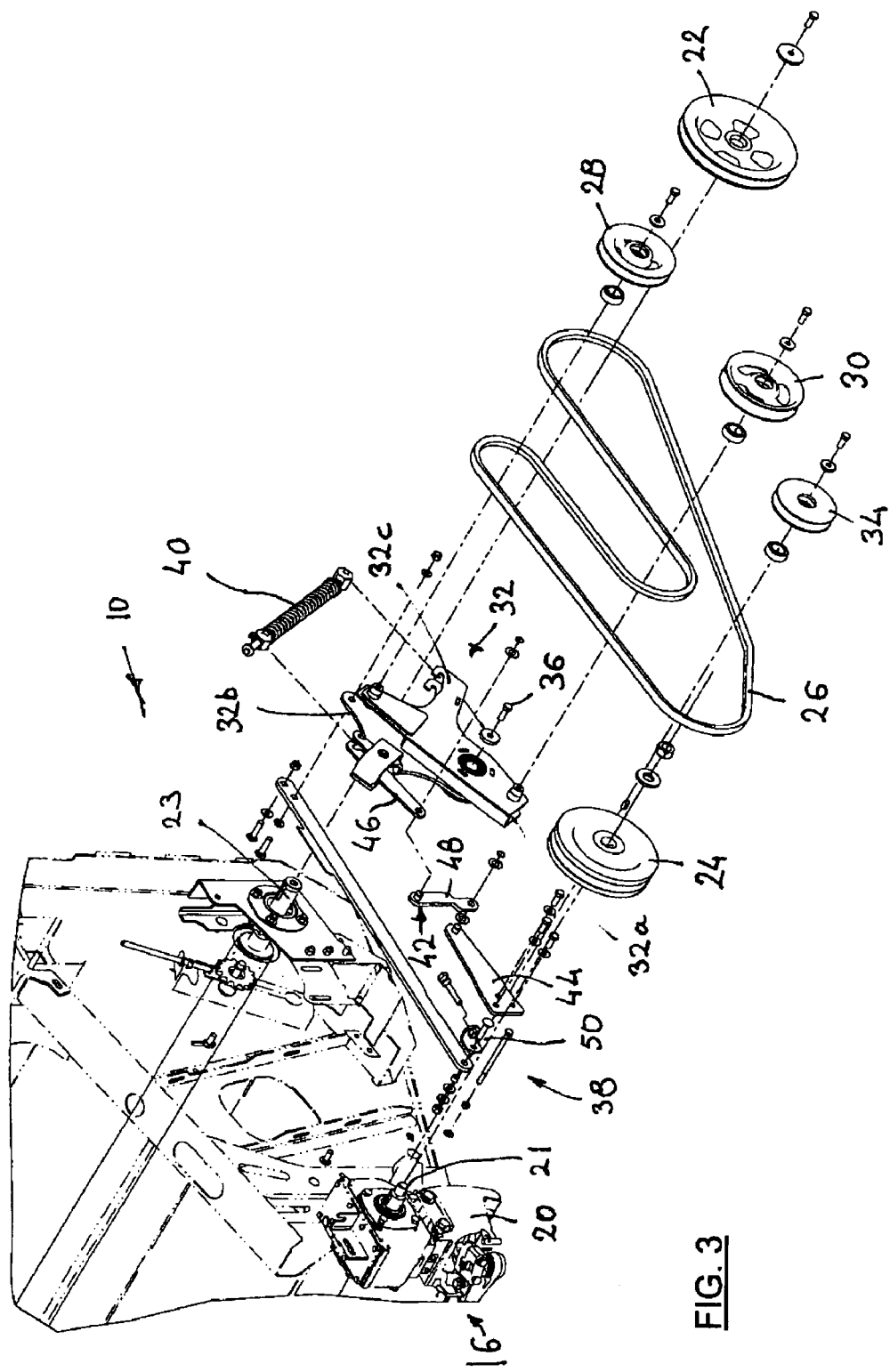
FIG. 3 is an exploded view of the belt drive of FIG. 1.

FIG. 1 illustrates an embodiment of a header and a belt drive tensioning system according to the present invention. The header 10 comprises a main frame 12 comprising a transverse auger (not shown) mounted in a trough extending substantially the full width of the header. The auger has a shaft 14 journalled in the side walls 15 of the header frame 12 and is rotated by chain or belt drive (not shown) on the right hand side of the header 10. A cutterbar 16 is mounted to a movable table 18, which is mounted to the main frame 12 by a set of telescoping guides underneath the auger trough.

The cutterbar 16 is connected to the output shaft of a gearbox 20, sometimes referred to as "wobble-box", which converts a permanent rotation of an input shaft 21 into a reciprocating movement of an output shaft. The gearbox 20 imposes a transverse movement of the knife sections of the cutterbar 20, which cooperate with stationary knife guides for cutting the stems of the standing crop while the harvester travels over a field.

A first, driving pulley 22 is mounted onto the end of a transverse drive shaft 23, which is connectable to the drive system of the combine harvester, adjacent the rear end of the main frame 12 of the header 10. A second, driven pulley 24 is mounted on the input shaft 21 of the gearbox 20 on the movable part 18 of the header 10. The pulley 24 is fitted to the input shaft 21 of the gearbox 20, which reciprocates the cutterbar 16. A belt 26 is mounted along the pulleys 22, 24 and two movable guide pulleys 28, 30. The guide pulleys 28, 30 are rotatably mounted on opposite arms of an outer element 32a of a pivot assembly 32. An extra idler pulley 34 is mounted on the front end of the frame 12 of the header 10.

The double idler/tensioning pivot assembly 32 having two pivot elements 32a, 32b is mounted by a common bushing on the auger shaft 14. This pivot point is an advantage that eliminates the need for a dedicated shaft for the pivot, since the available space for mounting the belt system is already very limited. Having the auger drive on the opposite side of the header provides the advantage is that the access to this tensioning mechanism is not hindered in any way. Furthermore, the pivot assembly 32 can be removed from the auger shaft by disassembling one bolt 36. The inner pivot element 32b is arranged parallel to and inward of the outer pivot element 32a.

As shown in FIG. 2B, a positioning linkage 38 is mounted between the movable part 18 of the header 10, above the gearbox 20, and the pivot assembly 32, more specifically to the inner pivot element 32b. When the header 10 is extended in forward direction, the positioning linkage 38 is pulled forward, hereby pivoting the pivot element 32b in a CCW direction around the auger shaft 14. The concurrent forward movement of the gearbox pulley 24 stretches the belt 26, which rotates the outer pivot element 32a in the same direction.

The outer pivot element 32a and its guide pulleys 28, 30 are loaded in a CW direction, tensioning the belt 26, by a compression spring 40, which is connected intermediately between the two pivot elements 32a, 32b. A first end of the spring 40 is connected to an arm 32c of the outer pivot element 32a, which arm 32c extends from the auger shaft 14 inbetween the guide pulleys 28, 30. The second end of the spring 40 is movably connected to the inner pivot element 32b via a tensioning linkage 42. The positioning linkage 38 positions the inner pivot element 32a and thereby generally positions the second end of the spring 40. The position of the first end of the spring 40 is generally defined by the rotative position of the outer pivot element 40a when the belt 26 is fully stretched. The distance between the spring ends determines the compression of the spring and hence the torque it applies onto the outer pivot element 32b.

Because the belt geometry changes as the cutterbar table 18 moves forwards, a larger torque is needed in the middle of the cutterbar range (FIG. 5) than in the rearwardmost (FIG. 4) and forwardmost (FIG. 6) positions. Furthermore, the torque range is very large, making this even more difficult to realise an appropriate tension in the belt 26. To keep the belt tension substantially constant in the full range, a tensioning linkage 42 is provided between a fixed connection 44 on the side wall 15 of the header frame 12 and the pivot assembly 32.

The tensioning linkage 42 comprises a lever 46, which is pivotably connected to a protrusion 32d of the inner pivot element 32b, which protrusion extends substantially opposite to the arm 32c of outer pivot element 32a. One end of the lever 46 is connected to said spring 40. The other end is pivotably connected to the fixed connection 44 by a hinge or link 48.

When the cutterbar table 18 is extended forward and the positioning linkage 38 pulls the inner pivot element 32b CCW around the auger shaft 14, the tensioning linkage 42 is also pulled towards its fixed connection 44. The link 48 will hereby first rotate the lever 46 CW relative to the pivot assembly 32 and compress the spring 40, applying a larger torque to the outer pivot element 32a and its pulleys 28, 30. When the header 10 is extended further, the lever 46 will reach a point where it stops rotating CW and starts rotating CCW relative to the pivot assembly 32. This is where the spring compression is diminishing and the consequent torque on the outer pivot element 32a will diminish accordingly.

The advantage is that the spring is compressed more in the middle of the cutterbar range, and less at the start and end of the range. The end positions (FIGS. 4 and 6) correspond to generally level positions of the guide pulleys 28, 30 and to belt trajectories close to the pivot (shaft 14). In the middle position (FIG. 5) the pulleys 28, 30 take generally perpendicular positions of the pulleys and the belt trajectory is remote from the pivot. Hence, for the same tension in the belt 26 a larger torque is needed in the middle position. According to the invention the belt tension is adjusted dynamically in the right proportion to keep it constant. This solution with a compact spring 40 has great advantage over known systems that use a very long spring along the frame of the header, together with a cable and pulley system to transfer the spring force onto a tensioning arm.

Figure 4:
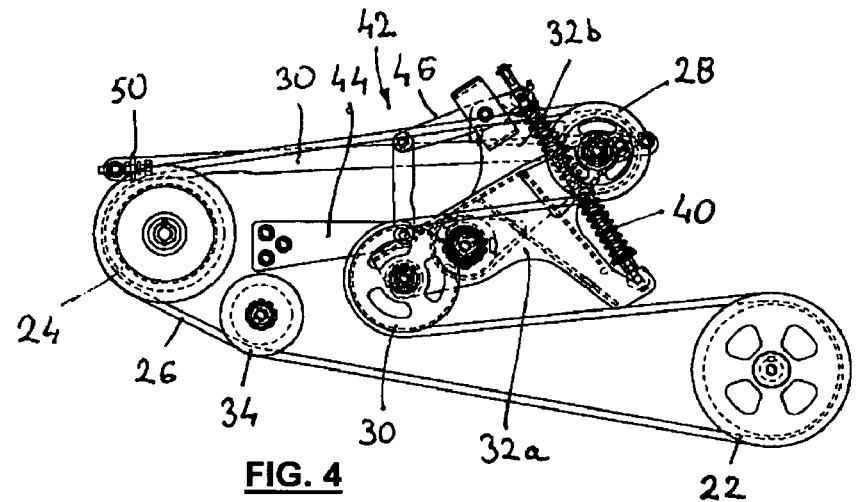
FIGS. 4, 5 and 6 are schematic representations showing the configuration of the belt drive in different positions of the extendable portion of the header where the cutterbar is in retracted, in middle and in front position.
Figure 5:
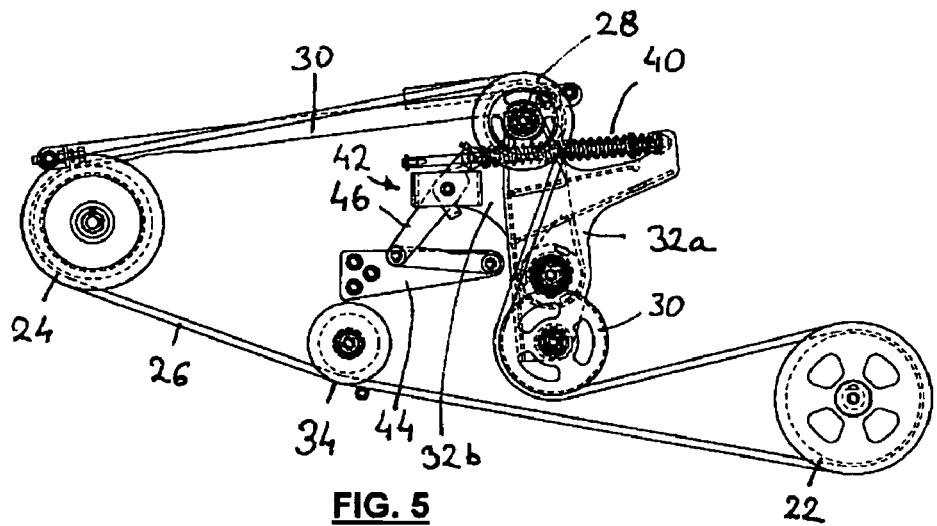
Figure 6:
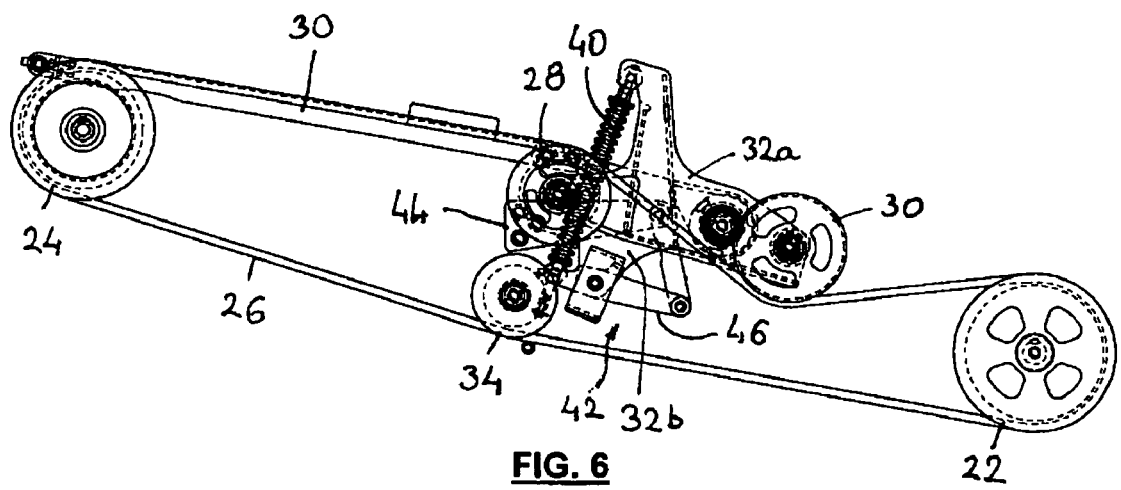

FIGS. 4, 5 and 6 show that the position and the geometry of the pivot assembly 32 and tensioning linkage 42 provide full range tensioning of the belt.

FIG. 4 illustrates an embodiment of the invention where the cutterbar table 16 is in fully rectracted position. The belt 26 is zigzagged along the guide pulleys 28, 30 on the outer pivot element 32a, which is loaded to its maximum CCW position by the spring 40. The spring is loaded downwardly by the lever 46, of which the position is determined by its pivot on protrusion 32d of the inner pivot element 32b and by the tensioning linkage 42. The position of the pivot element 32b itself is determined by the positioning linkage 38.

When the header 10 is half extended into its middle position, the inner pivot element 32b is pulled by the positioning linkage 38 in a position as shown in FIG. 5. The tensioning linkage 42 is also being pushed in a position whereby the lever 46 rotates to compress the spring 40 further and the tension on the belt is kept constant, while the pulleys 28, 30 are rotated CCW so as to provide more length of belt 26 at the front of the belt drive system.

Finally, FIG. 6 illustrates the position of the belt drive system as the cutterbar 16 is moved into its most extended forward position. The pivot assembly 32 is tilted even more by the positioning linkage 38; the pulleys 28, 30 are now positioned so that the belt 26 is stretched at its maximum length towards the movable cutterhead table 26; the tensioning linkage 42 compresses the spring 40 to a smaller extent to keep the belt tension constant.

To make assembly of the spring 40 easier, a pre-compressing arrangement may be used. The spring may be pre-compressed to a certain length, using e.g. a long bolt and nut arrangement, before installing on the header. After installation the spring can be released between and connected to the lever 46 and the outer pivot element 42 to achieve appropriate belt tension.

The tensioning arrangement may be adjusted in order to compensate for wear or lengthening of the belt 26 by means of a screw connection 50 of the positioning linkage 38 to the movable cutterhead table 12. Repositioning of the linkage 38 will change the position of the inner pivot element 32a and of the lever 46 mounted thereon. Hence it will change the distance of the spring connection on lever 46 to the spring connection on outer pivot element 32b and the consequent compression of the spring 40.

The invention claimed is:

1. An extendable header for a harvesting machine, said header comprising:

a cutterbar mounted on a movable part of the header;

an auger mounted to an auger shaft, wherein the auger shaft mounted to a frame of the header;

a belt drive mechanism drivingly connecting a stationary pulley mounted on the frame of the header, said belt drive mechanism further comprising two guide pulleys, a belt mounted along said pulleys, and a pivot assembly, wherein said pivot assembly is mounted on the auger shaft of the header and said guide pulleys are mounted on opposite ends of the pivot assembly, said pivot assembly being movable concurrently with the movable part of the header.

2. A header according to claim 1, wherein the pivot assembly includes a bushing mounted on the auger shaft of the auger.

3. A header according to claim 1, wherein said pivot assembly includes two pivotable elements and an intermediate spring, both guide pulleys being mounted on opposite ends of a first of the pivotable elements.

4. A header according to claim 3, wherein said belt drive mechanism further includes a mechanism for keeping the tension of the belt constant over the full range of header movement, said mechanism including a positioning linkage, the intermediate spring and a tensioning linkage, said positioning linkage being mounted between the movable part of the header and a second of the pivotable elements, said tensioning linkage being mounted between the header frame and said second pivotable element, and said spring being mounted between the first of the pivotable elements and the tensioning linkage.

5. A header according to claim 4, wherein said tensioning linkage and said positioning linkage are configured for varying the compression or extension of the spring when the cutterbar is moved away from or towards the frame.

6. A header according to claim 4, wherein said tensioning linkage is a hinge system that is configured to compress the spring when the cutterbar is moved towards a middle position, and to decompress the spring when the cutterbar is moved towards the fully extended or fully retracted position.

7. A header according to claim 1, wherein the pivot assembly is configured such that one of the guide pulleys is pivoted towards the movable pulley, and the other of the guide pulleys is pivoted towards the stationary pulley, such that the zigzag path traced by the belt around the pulleys is flattened and the belt gives more length between the stationary and relatively movable pulleys, when the cutterbar is moved away from the frame, and vice versa when the cutterbar is moved towards the frame.

8. A header according to claim 1, wherein one of the two guide pulleys mounted on the pivot assembly is positioned closer to the auger shaft of the auger than the other guide pulley.

9. A header according to claim 1, wherein the relatively movable pulley is fitted to an input shaft of a wobble box for reciprocating the blades of the cutterbar.

10. A header according to claim 1, wherein one or more idler pulleys are mounted on the frame of the header.

11. A header according to claim 1, wherein the pivot assembly is removable from the auger shaft of the auger by disassembling a single bolt.

* * * * *